(12) United States Patent
Bowers et al.

(10) Patent No.: US 8,790,217 B1
(45) Date of Patent: Jul. 29, 2014

(54) VEHICLES INCLUDING DIFFERENTIAL LOCK CONTROLLER AND METHODS

(71) Applicant: Honda Motor Co., Ltd., Tokyo (JP)

(72) Inventors: Lee N. Bowers, Springfield, OH (US); Rodney M. Frijas, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 13/782,116

(22) Filed: Mar. 1, 2013

(51) Int. Cl.
*B60W 10/04* (2006.01)
*F16H 48/20* (2012.01)

(52) U.S. Cl.
CPC .................................... *F16H 48/20* (2013.01)
USPC .......................................................... 477/35

(58) Field of Classification Search
USPC ...................... 180/249, 233; 701/88; 475/231
See application file for complete search history.

(56) References Cited

U.S. PATENT DOCUMENTS

| | | | |
|---|---|---|---|
| 3,368,638 A | 2/1968 | Terry et al. | |
| 3,845,671 A * | 11/1974 | Sharp et al. | 475/150 |
| 3,871,249 A | 3/1975 | Jeffers | |
| 4,549,448 A | 10/1985 | Kittle | |
| 4,671,373 A | 6/1987 | Sigl | |
| 4,681,185 A | 7/1987 | Hoernig et al. | |
| 4,765,434 A | 8/1988 | Kawamoto et al. | |
| 4,895,217 A * | 1/1990 | Hueckler et al. | 180/233 |
| 4,955,853 A | 9/1990 | Bausch | |
| 5,026,335 A | 6/1991 | Oftedal et al. | |
| 5,036,940 A | 8/1991 | Takemura | |
| 5,172,787 A * | 12/1992 | Kobayashi | 180/197 |
| 5,257,672 A | 11/1993 | Ohtagaki et al. | |
| 5,301,769 A * | 4/1994 | Weiss | 180/249 |
| 5,314,378 A | 5/1994 | Ohtagaki et al. | |
| 5,366,041 A | 11/1994 | Shiraishi et al. | |
| 5,373,912 A | 12/1994 | Haiki et al. | |
| 5,451,188 A | 9/1995 | Kraft et al. | |
| 5,456,641 A * | 10/1995 | Sawase | 475/86 |
| 6,038,506 A * | 3/2000 | Diekhans et al. | 701/88 |
| 6,085,138 A | 7/2000 | Smith et al. | |
| 6,524,207 B2 * | 2/2003 | Murakami et al. | 475/86 |
| 6,662,893 B2 | 12/2003 | Fukuda et al. | |
| 6,810,983 B2 * | 11/2004 | Matsuno | 180/249 |
| 6,820,712 B2 * | 11/2004 | Nakamura | 180/249 |
| 7,147,076 B2 | 12/2006 | Izumi | |
| 7,220,209 B1 | 5/2007 | Dahl et al. | |
| 7,344,469 B2 * | 3/2008 | Sharma et al. | 475/221 |
| 7,666,116 B2 | 2/2010 | Scheer et al. | |
| 7,770,681 B2 * | 8/2010 | Marathe et al. | 180/197 |
| 7,793,750 B2 * | 9/2010 | Ushiroda et al. | 180/249 |
| 8,265,845 B2 * | 9/2012 | Yamamura et al. | 701/69 |
| 8,352,145 B2 * | 1/2013 | Uematsu et al. | 701/88 |
| 8,504,254 B2 * | 8/2013 | Uematsu et al. | 701/50 |
| 8,635,002 B2 * | 1/2014 | Brenner et al. | 701/88 |
| 8,694,212 B2 * | 4/2014 | Uematsu et al. | 701/48 |
| 2004/0195028 A1 | 10/2004 | Izumi | |
| 2005/0266953 A1 * | 12/2005 | Puiu | 475/205 |

(Continued)

FOREIGN PATENT DOCUMENTS

JP 2000-64870 A 2/2000
WO 93/01065 A1 1/1993

*Primary Examiner* — Dirk Wright
(74) *Attorney, Agent, or Firm* — Ulmer & Berne LLP

(57) ABSTRACT

A vehicle includes a differential, a lock and a differential lock controller. The lock is associated with the differential and is movable between a locked position and an unlocked position. The differential lock controller is configured to selectively facilitate movement of the lock between the locked and unlocked positions.

20 Claims, 8 Drawing Sheets

(56) References Cited

U.S. PATENT DOCUMENTS

| | | |
|---|---|---|
| 2008/0081731 A1 | 4/2008 | Scheer et al. |
| 2008/0255735 A1 | 10/2008 | Marathe et al. |
| 2012/0041651 A1* | 2/2012 | Uematsu et al. ............... 701/50 |

* cited by examiner

VEHICLES INCLUDING DIFFERENTIAL LOCK CONTROLLER AND METHODS

TECHNICAL FIELD

Vehicles are provided which include a differential lock and a differential lock controller that operates the differential lock.

BACKGROUND

Conventional vehicles are often provided with a differential lock associated with a differential. The differential lock is movable to a locked position which facilitates locking of the differential. A selector switch is associated with the differential lock. An operator can actuate the selector switch to operate the differential lock to lock the differential.

SUMMARY

In accordance with one embodiment, a vehicle comprises an engine, a pair of wheels, a speed sensor, a differential, a lock, a selector switch, and a differential lock controller. The speed sensor is configured to detect a wheel speed of at least one of the pair of wheels. The differential is coupled with the pair of wheels. The lock is associated with the differential and is movable between a locked position and an unlocked position. The transmission has an input and an output. The input is coupled with the engine and the output is coupled with the differential. The transmission is configured to selectively and alternatively operate in a first gear and a second gear. When the transmission operates in the first gear, the input and the output are coupled together at a first gear ratio. When the transmission operates in the second gear, the input and the output are coupled together at a second gear ratio. The selector switch is movable between a lock-initiate position and an unlock-initiate position. The differential lock controller is coupled with the speed sensor, the lock, the transmission, and the selector switch. Upon movement of the selector switch into the unlock-initiate position, the differential lock controller is configured to facilitate movement of the lock into the unlocked position. Upon movement of the selector switch into the lock-initiate position, the differential lock controller is configured to: facilitate movement of the lock into the locked position when both the transmission operates in the first gear and the wheel speed is at or below a first threshold speed; inhibit movement of the lock when the wheel speed is above the first threshold speed; and inhibit movement of the lock when the transmission operates in the second gear.

In accordance with yet another embodiment a vehicle comprises an engine, a pair of wheels, a speed sensor, a lock, a differential, a selector switch, and a differential lock controller. The engine comprises a throttle. The speed sensor is configured to detect a wheel speed of at least one of the pair of wheels. The differential is coupled with the pair of wheels. The lock is associated with the differential and is movable between a locked position and an unlocked position. The selector switch is movable between a lock-initiate position and an unlock-initiate position. The differential lock controller is coupled with the speed sensor, the lock, and the selector switch. Upon movement of the selector switch into the unlock-initiate position, the differential lock controller is configured to facilitate movement of the lock into the unlocked position and wherein, upon movement of the selector switch into the lock-initiate position, the differential lock controller is configured to: inhibit movement of the lock when the wheel speed is above a first threshold speed; facilitate returning of the lock to the unlocked position if a position of the throttle exceeds a threshold position during movement of the lock to the locked position; and facilitate movement of the lock into the locked position when both the position of the throttle is below the threshold position and the wheel speed is at or below the first threshold speed.

In accordance with yet another embodiment, a vehicle comprises a wheel, a differential, a lock, and a differential lock controller. The wheel is configured to rotate at a wheel speed. The differential is coupled with the wheel. The lock is associated with the differential and is movable between a locked position and an unlocked position. The differential lock controller is associated with the lock. During movement of the lock into one of the unlocked position and the locked position, the differential lock controller is configured to facilitate movement of the lock to the locked position and the unlocked position, respectively, in response to the wheel speed.

BRIEF DESCRIPTION OF THE DRAWINGS

Various embodiments will become better understood with regard to the following description, appended claims and accompanying drawings wherein:

DETAILED DESCRIPTION

Figure 1:
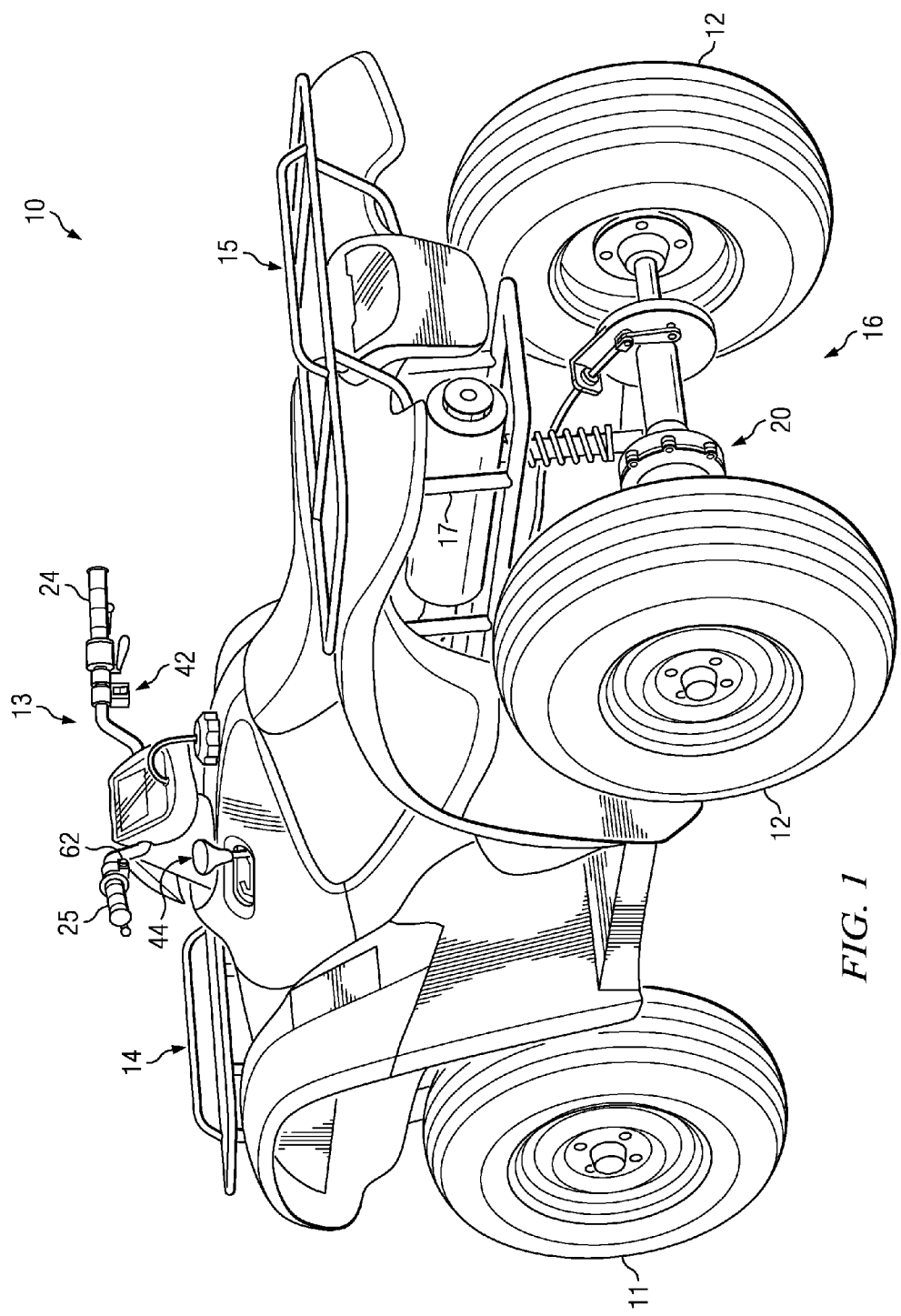
FIG. 1 is an elevated rear perspective view depicting a vehicle in accordance with one embodiment.

Certain embodiments are herein described in connection with the views and examples of FIGS. 1-10 wherein like numbers indicate the same or corresponding elements throughout the views. FIG. 1 illustrates a vehicle 10 which is shown to comprise an all terrain vehicle ("ATV"). However, a vehicle in accordance with alternative embodiments can comprise an automobile, a truck, a van, a recreational vehicle, a utility vehicle, agricultural equipment, construction equipment, or a mower, for example.

The vehicle 10 is shown to include front and rear wheels 11, 12. The front wheels 11 can comprise steerable wheels. A pair of handlebars 13 can be operably coupled with the front wheels 11 to facilitate steering of the front wheels 11. The vehicle 10 can also include front and rear cargo racks 14, 15 that are respectively supported at the front and rear of the vehicle 10 by a frame (e.g., 17). The front and rear cargo racks 14, 15 can facilitate support of cargo for transportation by the vehicle 10. Although the front and rear cargo racks 14, 15 are shown in FIG. 1 to comprise tubular frame assemblies, it will be appreciated that the front and rear cargo racks 14, 15 can be configured in any of a variety of suitable alternative arrangements for carrying cargo. It will also be appreciated that, in lieu of a front and/or a rear cargo rack, a vehicle may include a pump unit, a digging implement, a towing platform, a crane, additional passenger seating, or any of a variety of other implements, or might not include any cargo racks, such as an automobile, for example.

Figure 2:
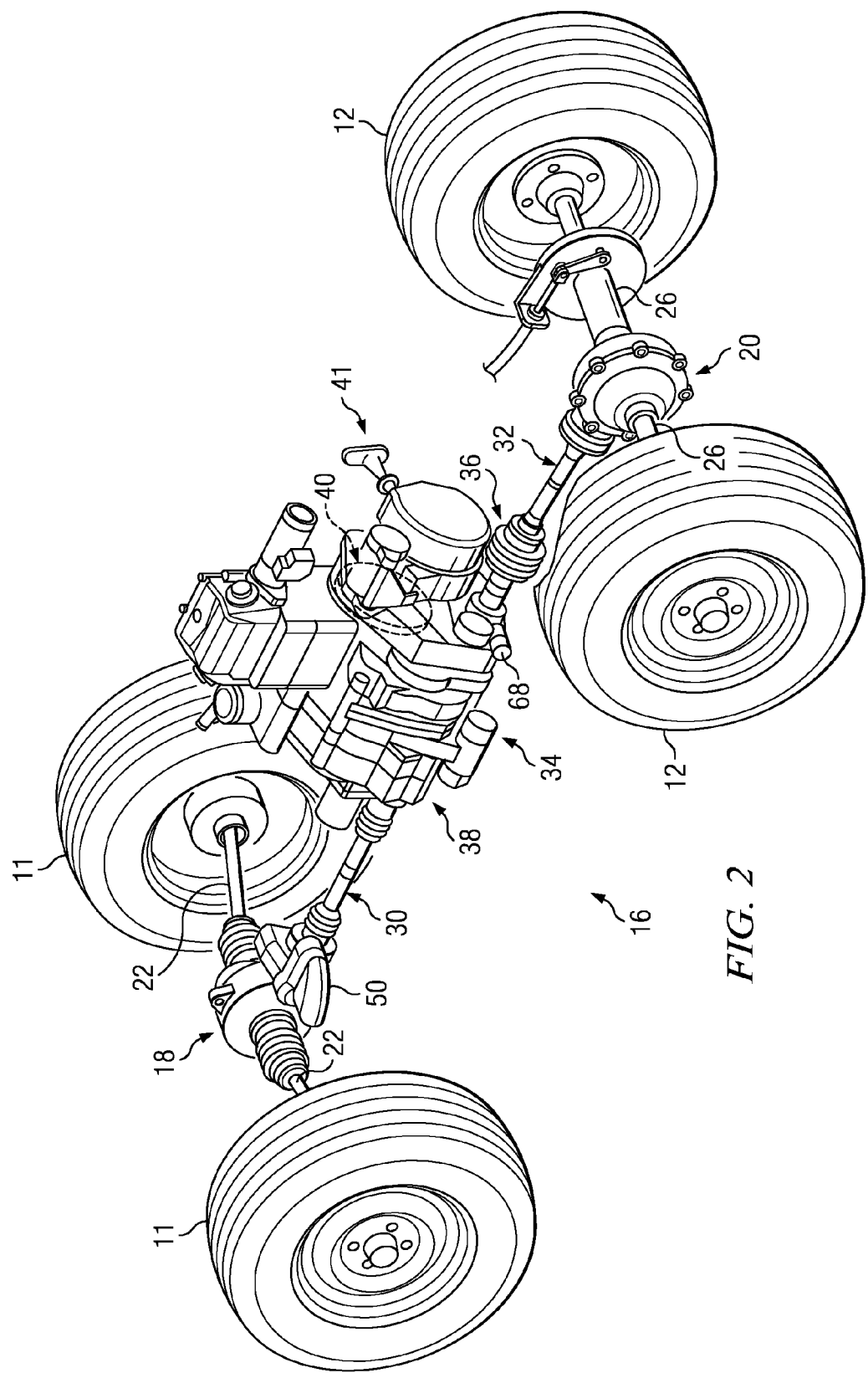
FIG. 2 is an elevated rear perspective view depicting portions of a drive train of the vehicle of FIG. 1.
Figure 3:
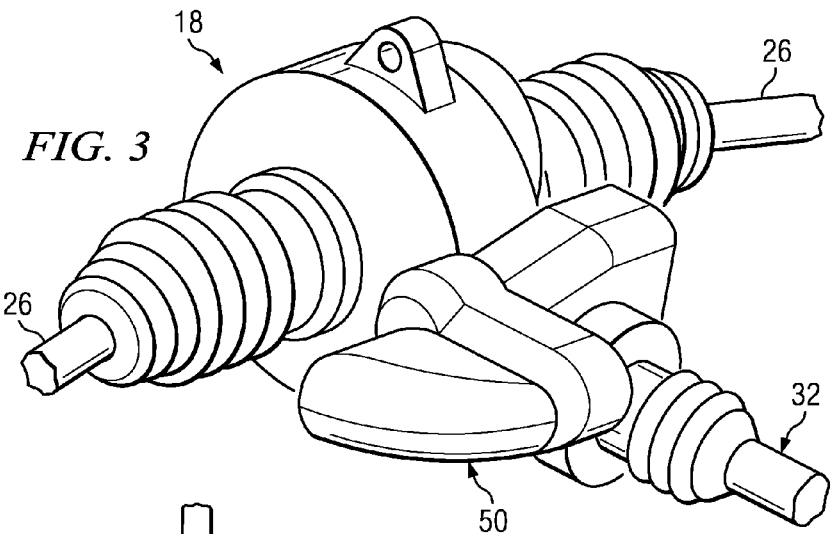
FIG. 3 is an enlarged elevated rear perspective view depicting a front differential and various associated components of the drive train of FIG. 2.

As illustrated in FIGS. 1 and 2, the vehicle 10 can include a drive train 16. The drive train 16 is shown to include a front differential 18 and a rear final gear 20. As illustrated in FIGS. 2 and 3, the front differential 18 is shown to be coupled with a pair of front axles 22 that facilitate rotational support of the front wheels 11. The rear final gear 20 is shown to be coupled with a pair of rear axles 26 that facilitate rotational support of the rear wheels 12. The drive train 16 is shown to include a front drive member 30 and a rear drive member 32 respectively coupled with the front differential 18 and the rear final gear 20. The drive train 16 is also shown to include a transmission 34 coupled with the front differential 18 and the rear final gear 20. The transmission 34 can be a hydraulic-type transmission, a hydrostatic-type transmission, a belt driven transmission, or any of a variety of other suitable transmission arrangements.

The front differential 18 can be configured to selectively vary the rotational speeds of the front wheels 11 with respect to one another. For example, when the vehicle 10 is navigating a turn, the front wheels 11 can rotate at different rotational speeds with respect to one another. In particular, the front differential 18 can be configured such that an increased rotational speed in one front wheel 11 causes a decreased rotational speed in the other front wheel 11.

The transmission 34 can include an input and an output. In one example, and as illustrated in FIG. 2, the transmission 34 can include a flywheel 40 and an output shaft 36. The flywheel 40 can be coupled with an engine 41 (e.g., through a crankshaft) and the output shaft 36 can be coupled with the rear drive member 32. It will be appreciated that the engine 41 can comprise an internal combustion engine, or can alternatively comprise an electric motor or other source of motive power. The input and output of the transmission 34 can be associated with each other such that operation of the input facilitates operation of the output. As is common, the transmission 34 can operate in a variety of different gears such that the engine 41 can drive the wheels 11, 12 at a variety of different speeds and torques, and in different directions.

In one embodiment, the transmission 34 can be configured to selectively and alternatively operate in a neutral gear, a reverse gear, a first forward driving gear, a second forward driving gear, a third forward driving gear, a fourth forward driving gear, a fifth forward driving gear, and an overdrive forward driving gear (e.g., operating gears). When in the neutral gear, operation of the input by the engine 41 does not result in operation of the output. Therefore, when the transmission 34 is in the neutral gear, power from the engine 41 is not transmitted to the rear wheels 12. When the transmission 34 is in the reverse gear, power from the engine 41 can be transmitted to the rear wheels 12 to facilitate movement of the vehicle 10 in a reverse direction. When in each of the forward driving gears, power from the engine 41 is transmitted to the rear wheels 12 to facilitate movement of the vehicle 10 in a forward direction. As is common, the transmission 34 can be shifted among the operating gears to facilitate operation of the wheels (e.g., 11, 12) at a variety of different forward speed ranges. It will be appreciated that the input of the transmission 34 can operate the output of the transmission 34 at a different gear ratio depending upon the selected operating gear of the transmission 34. It will also be appreciated that, although the transmission 34 is described above to include a 5-speed transmission, the transmission can be configured with any quantity of different driving gears (e.g., a 3-speed transmission).

Figure 4:
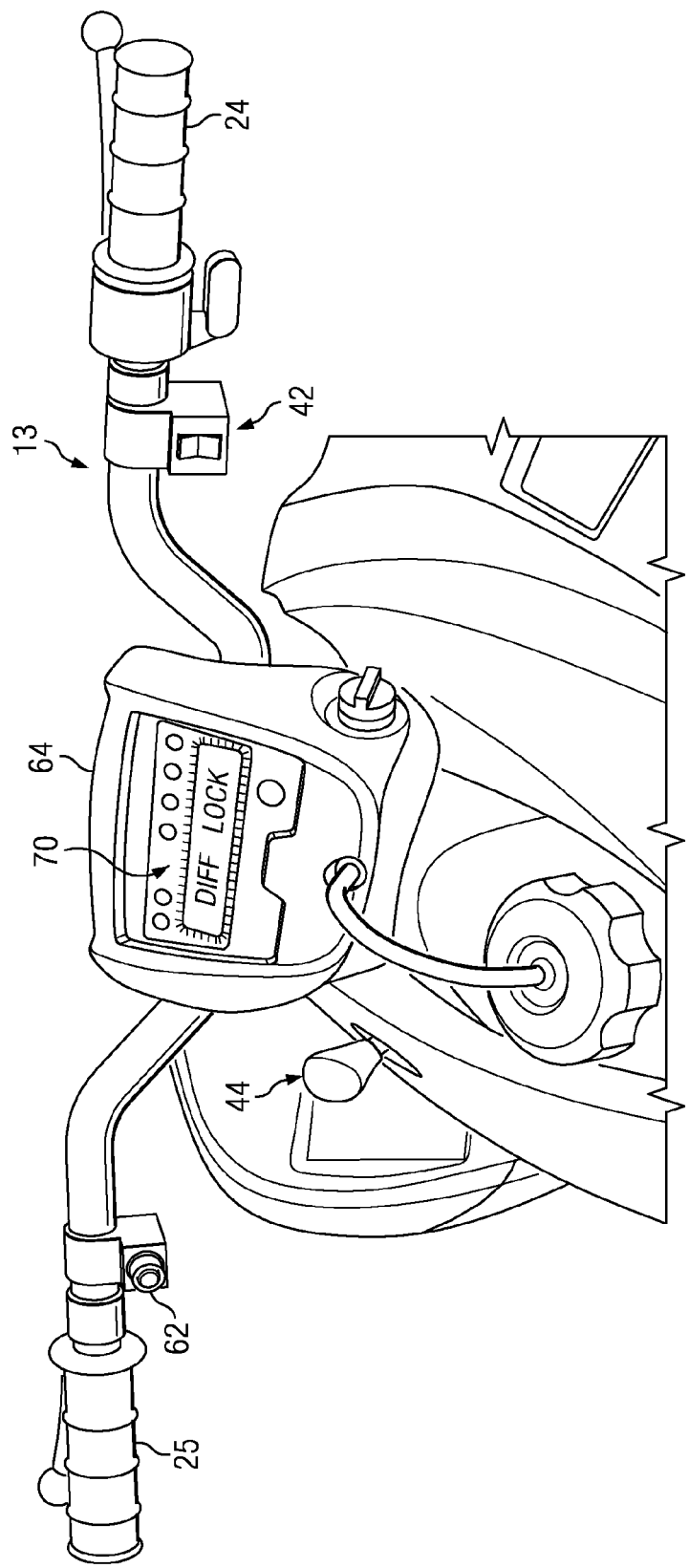
FIG. 4 is an enlarged elevated rear perspective view depicting handlebars of the vehicle of FIG. 1.

In one embodiment, the transmission 34 can comprise an automated manual transmission ("AMT") that is shifted between operating gears by a transmission switch 42. The transmission switch 42 can be movable between an upshift position and a downshift position. As illustrated in FIGS. 1 and 4, the transmission switch 42 can be secured to the handlebars 13 adjacent to a right hand grip 24 such that, during operation of the vehicle 10, a user can actuate the transmission switch 42 (e.g., with a right thumb) without releasing the right hand grip 24.

During operation of the vehicle 10, a user can selectively actuate the transmission switch 42 to select from among a variety of operating speed ranges. For example, when the vehicle 10 is at rest, the user can momentarily depress the transmission switch 42 into the upshift position to engage the transmission 34 in the first forward driving gear. Once the wheels reach a first forward speed (e.g., a wheel speed that facilitates a vehicle speed of 10 M.P.H.), the user can repeatedly depress the transmission switch 42 into the upshift position to shift the transmission 34 into higher forward driving gears (e.g., the third, fourth, fifth, and overdrive forward driving gears) to facilitate further acceleration of the wheels 11, 12, and resultant further acceleration of the vehicle 10. Conversely, the user can depress the transmission switch 42 into the downshift position to shift the transmission 34 into lower forward driving gears to facilitate operation of the wheels 11, 12 at lower speeds (e.g., during braking).

In one embodiment, the transmission switch 42 can comprise a three-position rocker switch, as shown in FIG. 4. In such an embodiment, when the user releases the transmission switch 42 from either the upshift or the downshift position, the transmission switch 42 can automatically move into a home position. It will be appreciated, however, that any of a variety of suitable alternative transmission switches can be associated with an AMT, such as one or more pushbuttons or a selection lever, for example.

Although the transmission 34 is described above with respect to an AMT, it will be appreciated that a transmission can comprise any of a variety of suitable alternative configurations. For example, in one alternative embodiment, the transmission 34 can comprise an automatic-type transmission having a shift lever that is movable (e.g., by an operator) between a park position, a reverse position, a neutral position, and multiple drive positions (e.g., D4, D3, D2, etc.). When the shift lever is moved into the reverse position, the transmission 34 can operate in the reverse gear. When the shift lever is moved into the neutral position, the transmission 34 can operate in the neutral gear. When the shift lever is moved into the drive position, the transmission 34 can automatically shift between the forward driving gears during operation of the vehicle 10. In one embodiment, automatic shifting of the transmission 34 can be achieved through use of a transmission control unit (TCU) or a powertrain control module (PCM), for example.

In another alternative embodiment, the transmission 34 can comprise a manual-type transmission. In such an embodiment, the transmission 34 can be operably coupled with a clutch. A user can selectively operate the clutch (e.g., through use of a grip handle or a foot pedal) to enable manual shifting of the transmission 34 between the operating gears. The transmission 34 can be manually shifted with a shift lever, a pushbutton, or any of a variety of suitable shifting arrangements. In yet another alternative embodiment, the transmission 34 can comprise a continuously variable transmission ("CVT"). In such an embodiment, the transmission 34 can have an infinitely variable gear ratio such that the first gear of the CVT can be defined as a particular range of gear ratios and the second gear of the CVT can be defined as another range of gear ratios which is different from the range of gear ratios defined by the first gear. In another embodiment where the engine 41 is an electric motor, the vehicle 10 might not include a transmission since the speed of the electric motor could be varied by varying input power to the electric motor.

As illustrated in FIG. 2, a transfer assembly 38 can be associated with the output shaft 36 of the transmission 34. The transfer assembly 38 can be configured to selectively couple the output shaft 36 to the front drive member 30 (e.g., with a chain or gears) to facilitate operation of the vehicle 10 from a two-wheel drive (2WD) state to a four wheel drive (4WD) state. When the output shaft 36 is uncoupled from the front drive member 30, only the rear wheels 12 are driven by the engine 41 such that the vehicle 10 operates in a rear-wheel 2WD state. When the output shaft 36 is coupled with the front drive member 30, the front wheels 24 and the rear wheels 12 are driven by the engine 41 such that the vehicle 10 operates in the 4WD state. In an alternative embodiment, a transfer assembly can additionally selectively couple a rear output shaft of a transmission with a rear drive member such that the transfer assembly can facilitate selective operation of an associated vehicle in a 2WD state in which only front wheels are driven, a 2WD state in which only rear wheels are driven, a 4WD state in which front and rear wheels are driven, and a neutral state in which no wheels are driven.

Figure 5:
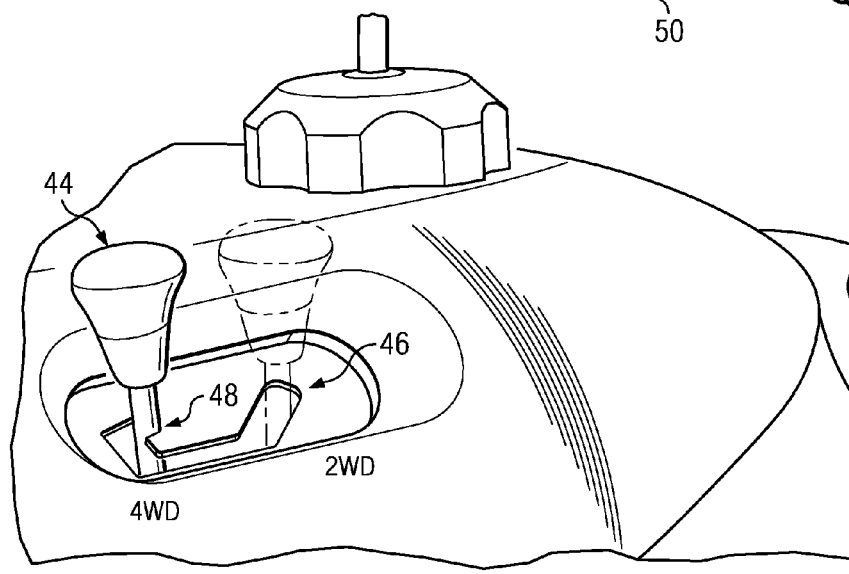
FIG. 5 is a perspective view depicting a 2WD/4WD lever and other components of the vehicle of FIG. 1 according to one embodiment.

As illustrated in FIGS. 1 and 5, the vehicle 10 can include a 2WD/4WD lever 44 that is provided adjacent to the handlebars 13 and can be operatively coupled with the transfer assembly 38. In one embodiment, the 2WD/4WD lever 44 is movable between a 2WD position 46 and a 4WD position 48. When the 2WD/4WD lever 44 is in the 2WD position 46 (shown in dashed lines in FIG. 5), the transfer assembly 38 can facilitate operation of the vehicle 10 in a 2WD state such that the rear wheels 12 are driven by the engine 41 (e.g., rear 2WD state). When the 2WD/4WD lever 44 is in the 4WD position 48, the transfer assembly 38 can facilitate operation of the vehicle 10 in a 4WD state such that the front and rear wheels 11, 12 are driven by the engine 41.

When the wheel speed of one of the front wheels 11 suddenly increases (e.g., when the vehicle navigates rough or slippery terrain), the wheel speed of the opposite front wheel 11 can suddenly decrease, thereby affecting desired operation of the vehicle 10 in certain driving conditions. The front differential 18 can, however, be selectively locked to ensure that the front wheels 11 rotate at the same wheel speed. As such, a front differential lock 50 can be associated with the front differential 18, as illustrated in FIGS. 2 and 3. The front differential lock 50 can comprise a conventional motor controlled, ring-type lock. It will be appreciated, however, that any of a variety of suitable alternative differential lock configurations can be used.

The front differential lock 50 can be movable between a locked position and an unlocked position. When the front differential lock 50 is in the unlocked position, the front wheels 11 can be free to rotate at different rotational speeds with respect to one another. However, when the front differential lock 50 is in the locked position, the front wheels 11 can be constrained by the front differential 18 to rotate in unison with one another.

Figure 10:
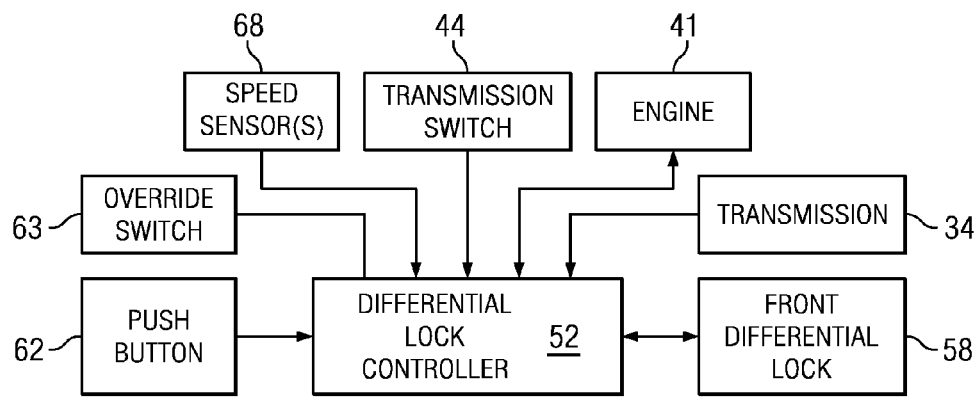
FIG. 10 is a block diagram generally schematically depicting a differential lock controller and certain associated components of the vehicle of FIG. 1.

The front differential lock 50 can be associated with a differential lock controller (generally shown as 52 in FIG. 10). A selector switch can also be associated with the differential lock controller 52 to facilitate control of the front differential lock 50 by an operator of the vehicle 10. The selector switch can be configured for actuation by an operator between a lock-initiate position and an unlock-initiate position. For example, the selector switch can be moved into the lock-initiate position when the operator wants to lock the front differential 18 (e.g., move the front differential lock 50 to the locked position). The selector switch can be moved into the unlock-initiate position when the operator wants to unlock the front differential 18 (e.g., move the front differential lock 50 to the unlocked position).

Figure 6:
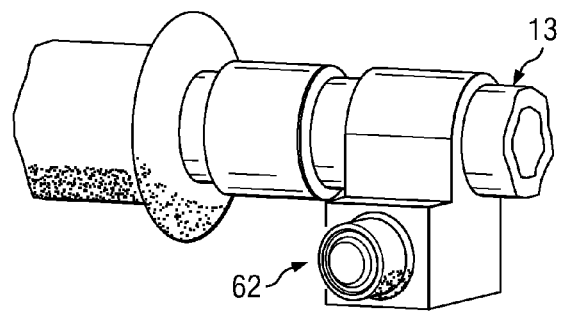
FIG. 6 is an enlarged perspective view depicting a portion of the handlebars of FIG. 4.
Figure 7:
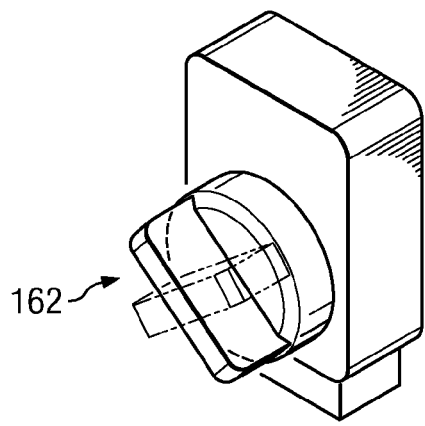
FIG. 7 is a perspective view depicting a selector switch according to another embodiment, wherein first and second positions of the selector switch are shown in solid and dashed lines, respectively.

In one embodiment, as illustrated in FIG. 6, the selector switch can comprise a pushbutton 62 that can be selectively depressed between a lock-initiate and an unlock-initiate position to effect locking and unlocking of the vehicle's differential(s). The pushbutton 62 can be mounted on the handlebars 13 adjacent to a left hand grip 25 such that, during operation of the vehicle 10, a user can depress the pushbutton 62 with a left thumb without releasing the left hand grip 25. It will be appreciated that the pushbutton 62 can comprise a latching pushbutton, a non-latching pushbutton, or any of a variety of other suitable pushbutton, or switch arrangements. For example, in one alternative embodiment and as illustrated in FIG. 7, a selector switch can comprise a two-position rotary switch 162. The two-position rotary switch 162 can be mounted within reach of an operator (e.g., along a console of a vehicle) such that the operator can manually rotate the two-position rotary switch 162 between a lock-initiate position and an unlock-initiate position to effect locking and unlocking of the vehicle's differential(s).

Figure 8:
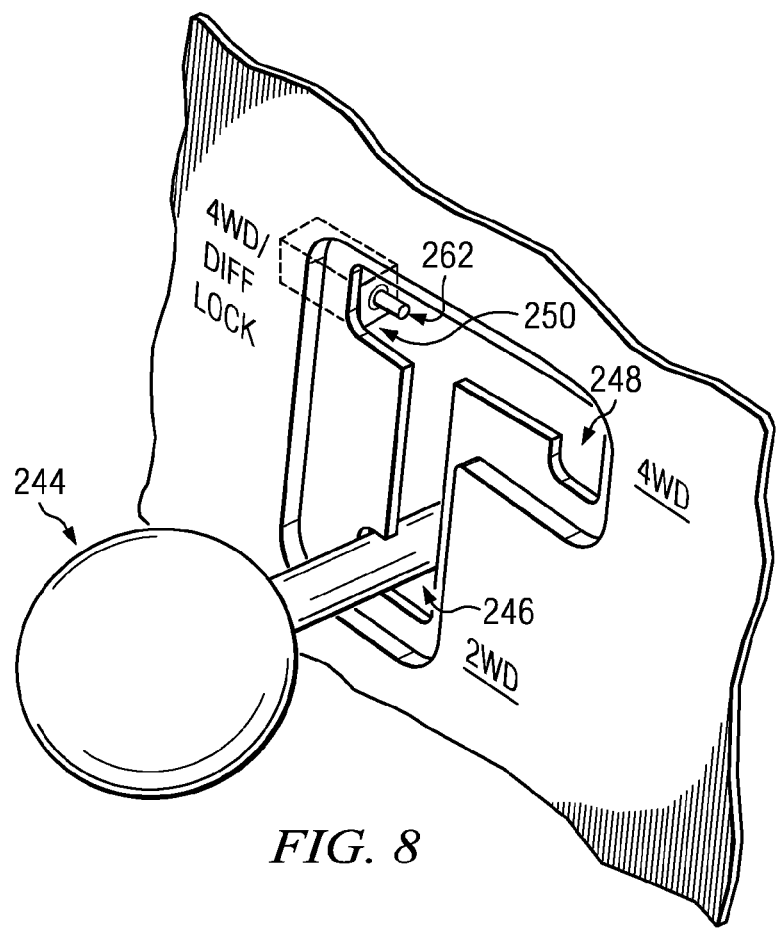
FIG. 8 is a perspective view depicting a 2WD/4WD lever that includes a selector switch according to another embodiment.

In an alternative embodiment, as illustrated in FIG. 8, the selector switch can comprise a plunger switch 262 that is movable between an extended, unlock-initiate position and a depressed, lock-initiate position. The plunger switch 262 can be associated with a 2WD/4WD lever 244. The 2WD/4WD lever 244 can be similar in many respects to the 2WD/4WD lever 44 described above and shown in FIG. 5. For example, the 2WD/4WD lever 244 can be moved into a 2WD position 246 and a 4WD position 248 that facilitates operation of the vehicle in a 2WD state and a 4WD state, respectively. The 2WD/4WD lever 244 however can also be moved into a 4WD/Differential Lock position 250 that facilitates locking of the front differential 18. When the 2WD/4WD lever 244 is moved into the 4WD/Differential Lock position 250, the 2WD/4WD lever 244 can depress the plunger switch 262 into the lock-initiate position to facilitate locking of the front differential 18. When the 2WD/4WD lever 244 is taken out of the 4WD/Differential Lock position 250 (e.g., and moved into either the 2WD position 246 or the 4WD position 248), the plunger switch 262 can extend into the unlock-initiate position to facilitate unlocking of the front differential 18.

One or more wheel speed sensors can be associated with the differential lock controller 52. A wheel speed sensor can be configured to detect a wheel speed of one or more of the wheels of a vehicle. In one embodiment, as illustrated in FIG. 2, the wheel speed sensor can comprise a drive shaft speed sensor 68. The drive shaft speed from the drive shaft speed sensor 68 can be transmitted to the differential lock controller 52 for use in calculating the wheel speed of the vehicle 10. In another embodiment, the wheel speed sensors can be located on one or more of the wheels (e.g., as part of an antilock braking system). Wheel speed sensors can be provided in any of a variety of other suitable arrangements such as, for example, associated with a transmission, a transfer assembly, or an engine, and can thereby indirectly obtain wheel speed data.

The differential lock controller 52 can be associated with the transmission switch 42 and the transmission 34 and can accordingly be configured to detect the operating gear of the transmission 34. In particular, the differential lock controller 52 can monitor the position of the transmission switch 42 and/or can be coupled with a transmission switch position detector (not shown) located within the transmission 34 to assess the operating gear of the transmission 34.

It will be appreciated that the front differential lock 50 can be selectively controlled by an operator. For example, if the vehicle 10 encounters difficult terrain, an operator can actuate the selector switch to lock the front differential 18 and thereby improve the traction of the front wheels 11. In another example, if some of the wheels 11, 12 are unable to gain traction (e.g., the vehicle 10 is hindered by muddy terrain), the front differential 18 can be selectively locked such that the front wheels 11 can attempt to gain traction.

The differential lock controller 52 can facilitate selective operation of the front differential lock 50. In particular, the differential lock controller 52 can monitor the position of the selector switch and can either inhibit or facilitate movement of the front differential lock 50 depending, for example, upon the wheel speed and/or the operating gear of the transmission 34.

It will be appreciated that, when wheel speed increases (e.g., to accelerate the vehicle 10), the movement of the internal components of the front differential 18 correspondingly increases. As the speed of the internal components increases, it may become more difficult to move the front differential lock 50 without adversely affecting the performance of the vehicle 10 and/or damaging the drive train 16. For example, when the front wheels 11 are operating above a rotational speed that facilitates a vehicle speed of 6 M.P.H., movement of the front differential lock 50 into the locked position can result in harm to the front differential 18. The differential lock controller 52 can thus be configured to inhibit movement of the front differential lock 50 to the locked position when the wheel speed is above a threshold speed (e.g., a rotational speed that facilitates a vehicle speed of 6 M.P.H.). The differential lock controller 52 can therefore prohibit an operator from locking the front differential 18 (e.g., through use of the selector switch) if the wheels 11, 12 of the vehicle 10 are above the threshold speed.

For example, when the operator chooses to lock the front differential 18 (e.g., when the vehicle 10 encounters difficult road conditions), the operator can move the selector switch to the lock-initiate position (e.g., by depressing the pushbutton 62). If one or more of the wheels 11, 12 is rotating above the threshold speed, the differential lock controller 52 can prevent the front differential 18 from locking.

When the transmission 34 is operating in either the second forward driving gear, the third forward driving gear, the fourth forward driving gear, the fifth forward driving gear, or the overdrive driving gear, movement of the front differential lock 50 into the locked position can adversely affect the ride and/or overall performance of the vehicle 10 and may, in some cases, result in damage to the front differential 18. The differential lock controller 52 can thus be configured to inhibit movement of the front differential lock 50 into the locked position when the transmission 34 is operating in one of these gears. More particularly, the differential lock controller 52 can prohibit an operator from locking the front differential 18 with the selector switch if the transmission 34 is operating in one of these gears. In one embodiment, when the selector switch is moved from the unlock-initiate position to the lock-initiate position, the differential lock controller 52 can prevent the front differential lock 50 from moving to the locked position if the transmission 34 is operating in any of the second forward driving gear, the third forward driving gear, the fourth forward driving gear, the fifth forward driving gear, or the overdrive driving gear.

The differential lock controller 52 can accordingly be configured to facilitate movement of the front differential lock 50 to the locked position when the wheel speed is at or below a threshold speed and when the transmission 34 operates in a particular gear. Therefore, the differential lock controller 52 can only permit an operator to lock the front differential 18 (e.g., through operation of the selector switch) when the wheel speed is at or below the threshold speed and when the transmission is operating in a particular gear. In one embodiment, when the selector switch is moved to the lock-initiate position, the differential lock controller 52 will move the front differential lock 50 from the unlocked position to the locked position if the wheel speed is at or below a rotational speed that facilitates a vehicle speed of 6 M.P.H. and if the transmission 34 is operating in either the reverse gear, the neutral gear, or the first forward driving gear. It will be appreciated, however, that the differential lock controller 52 can be configured to inhibit movement of the front differential lock 50 to the locked position according only to either the wheel speed or the transmission gear, or according to a variety of other suitable vehicular conditions.

Once the front differential 18 is in the locked position, the differential lock controller 52 can be further configured to restrict the speed of the engine 41 such that the wheel speed will not increase above a second threshold speed. In one embodiment, once the front differential lock 50 is moved into the locked position, the differential lock controller 52 can restrict the speed of the engine 41 such that the vehicle speed (e.g., as determined from wheel speed sensors) does not exceed about 20 M.P.H. It will be appreciated that controlling the speed of the vehicle 10 in this manner can improve the overall control of the vehicle during locking of the differential better than some conventional vehicles. For example, preventing the differential from locking during excessive vehicular speeds can prevent excessive steering system kickback that might otherwise occur, such as in some conventional vehicles having a steering arm-type steering arrangement (as opposed to a rack and pinion arrangement).

As illustrated in FIG. 10, the vehicle 10 can include an override switch 63 associated with the differential lock controller 52. The override switch 63 can be configured to allow an operator to select the restriction speed of the vehicle 20. For example, the override switch 63 can be a two-position switch (i.e., similar to the switch 162 illustrated in FIG. 7) that is operable between a first position (i.e., an OFF position) and a second position (i.e., an ON position). When the override switch 63 is in the first position, the speed of the vehicle 20 can be restricted to the original (i.e., second) threshold speed. However, when the override switch is in the second position, the second threshold speed is overridden and the speed of the vehicle 20 can be restricted to a different (i.e., third) threshold speed which can be different from (e.g., faster or slower) than the second threshold speed. It will be appreciated that even if the third threshold speed is faster than the second threshold speed, the third threshold speed is still low enough to prevent damage to the locked differential. In other embodiments, the override switch 63 can be a three-position switch, a digital touchscreen, or any other suitable alternative actuator that facilitates selection between a variety of different threshold speeds.

The movement of the front differential lock 50 between the unlocked position and the locked position can occur over an extended period of time (e.g., about 2 seconds). During movement of the front differential lock 50 to one of the locked and unlocked positions, the differential lock controller 52 can be configured to facilitate movement of the front differential lock 50 to the unlocked and locked position, respectively, in response to one of the wheel speed and/or gear of the transmission 34. In one embodiment, if either the wheel speed increases above the threshold speed or the gear of the transmission 34 is changed during the transition of the front differential lock 50 between the unlocked position and the locked position, the differential lock controller 52 can return the front differential lock 50 to its initial position prior to the transition. In another embodiment, when the front differential lock 50 is moving to the unlocked position, the differential lock controller 52 can restrict the vehicle speed to its threshold speed (e.g., about 20 M.P.H.) until the front differential lock 50 completely reaches the unlocked position.

In one embodiment, when the front differential lock 50 moves out of the unlocked position and towards the locked position, but has not reached a fully locked position, the differential lock controller 50 can monitor the position of a throttle (not shown) and the wheel speed of the vehicle 10 as part of a lost motion differential protection scheme. If either the throttle position exceeds a threshold throttle position or the wheel speed exceeds the threshold first threshold speed, the differential controller can retard the engine 41 to slow the vehicle 10 and the front differential lock 50 can be returned to the unlocked position. Once the conditions of the vehicle 10 are again appropriate to permit locking of the vehicle 10, the differential lock 50 can proceed with locking of the front differential 18. The position of the throttle can be detected with a throttle position sensor or any of a variety of suitable alternative arrangements. It will be appreciated that the desired acceleration of the vehicle can determined from the position of the throttle. The threshold throttle position can therefore be selected to prevent the vehicle 10 from accelerating at a rate that could affect proper locking of the front differential 18.

As illustrated in FIGS. 1 and 4, the handlebars 13 can include a center console 64 that includes a lock indicator 70. The lock indicator 70 can be associated with and controlled by the differential lock controller 52. In one embodiment, the lock indicator 70 can be configured to indicate when the front differential lock 50 is in the locked position. For example, when the front differential lock 50 is locked, the lock indicator 70 can be illuminated to notify the operator of the vehicle 10. In another embodiment, the lock indicator 70 can be configured to indicate when the front differential lock 50 is being inhibited from moving to the locked position when the selector switch is in the lock-initiate position. For example, when the selector switch is moved to the lock-initiate position and the differential lock controller 52 inhibits the front differential lock 50 from moving to the locked position, the indicator 70 can intermittently illuminate (i.e., flash) to notify the operator of the vehicle. The lock indicator 70 can comprise any one of an indicator light, a display icon, a heads-up display icon, a buzzer, or some other visual and/or indicator, for example.

It will be appreciated that in some embodiments, in lieu of a rear final gear 20, the vehicle 10 can include a rear differential. The rear differential can be coupled with the rear wheels 12 by way of the rear axles 26 and can be similar in many respects to the front differential 18. For example, the rear differential can include a rear differential lock that is controlled by the differential lock controller 52. It will be appreciated that the rear differential can be controlled by the differential lock controller 52 in a similar manner as described above with respect to the front differential 18. In one embodiment, the differential lock controller 52 can be configured to facilitate operation of the rear differential lock simultaneously with the operation of the front differential lock 50. In an alternative embodiment, the differential lock controller 52 can be configured to facilitate operation of only the rear differential lock. In another alternative embodiment, the differential lock controller 52 can be configured to facilitate independent operation of the front and rear differential locks.

Although the vehicle 10 is shown to be of a type having four wheels (e.g., 11 and 12), it will be appreciated that a vehicle can alternatively include more than four wheels or less than four wheels. In addition, although the drive train 16 is shown to include a front differential 18 with associated front differential lock 50, it will be appreciated that a drive train can be provided in any of a variety of suitable alternative configurations. For example, a rear wheel drive vehicle might include only a rear differential and an associated rear differential lock. A differential lock controller can work with vehicles having one, two, or more than two differentials, wherein some or all of those differentials are capable of locking.

It will be appreciated that the differential lock controller can be provided upon a vehicle in any of a variety of suitable locations and configurations. The differential lock controller can be a stand alone controller or can alternatively be integrated into a vehicular controller such as an electronic control unit (ECU), for example. It will also be appreciated that the differential lock controller can be configured to implement any of a variety of suitable control routines or functionality.

Figure 9A:
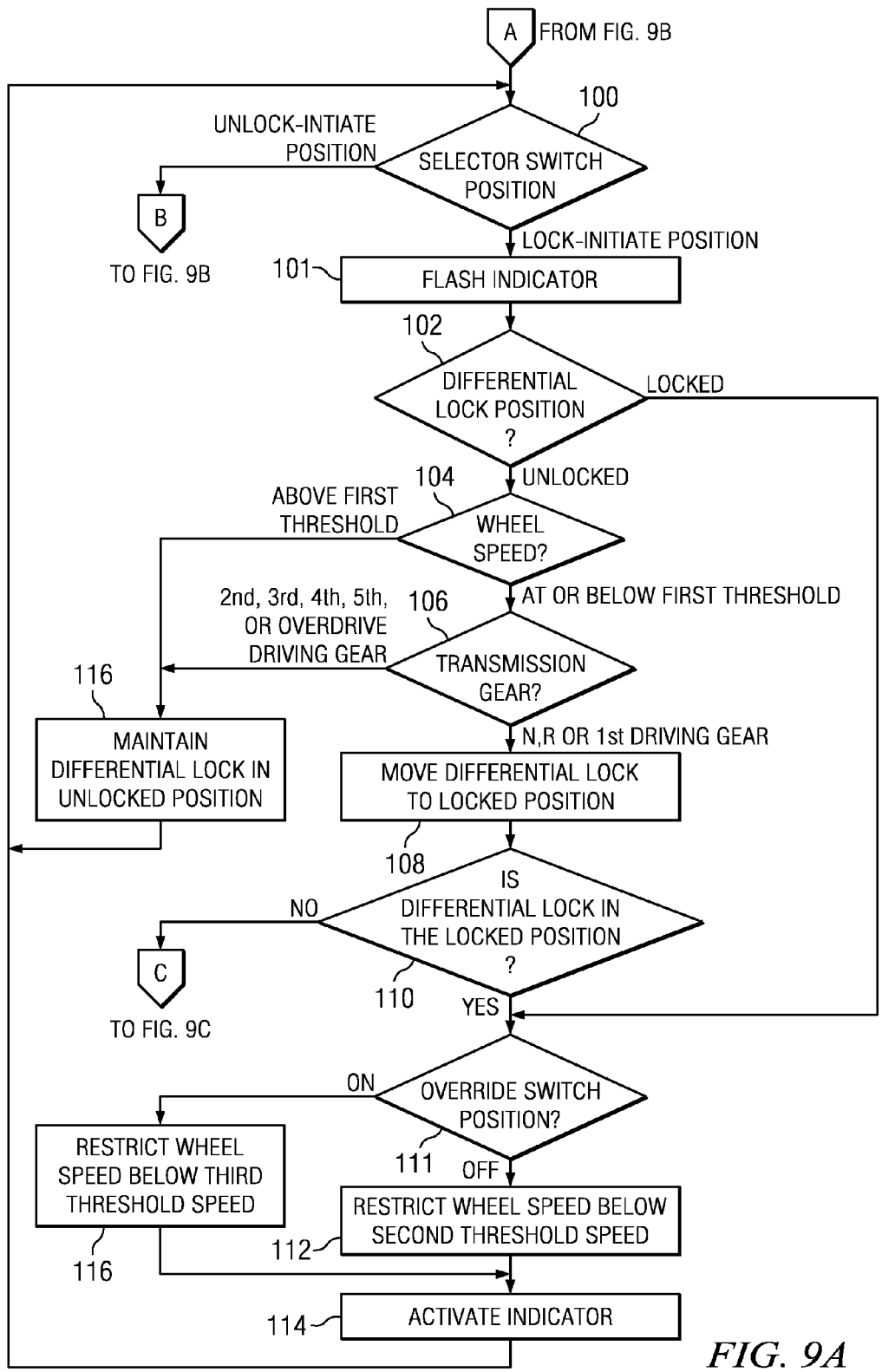
FIGS. 9A, 9B, and 9C depict a control routine for a differential lock controller in accordance with one embodiment.
Figure 9B:
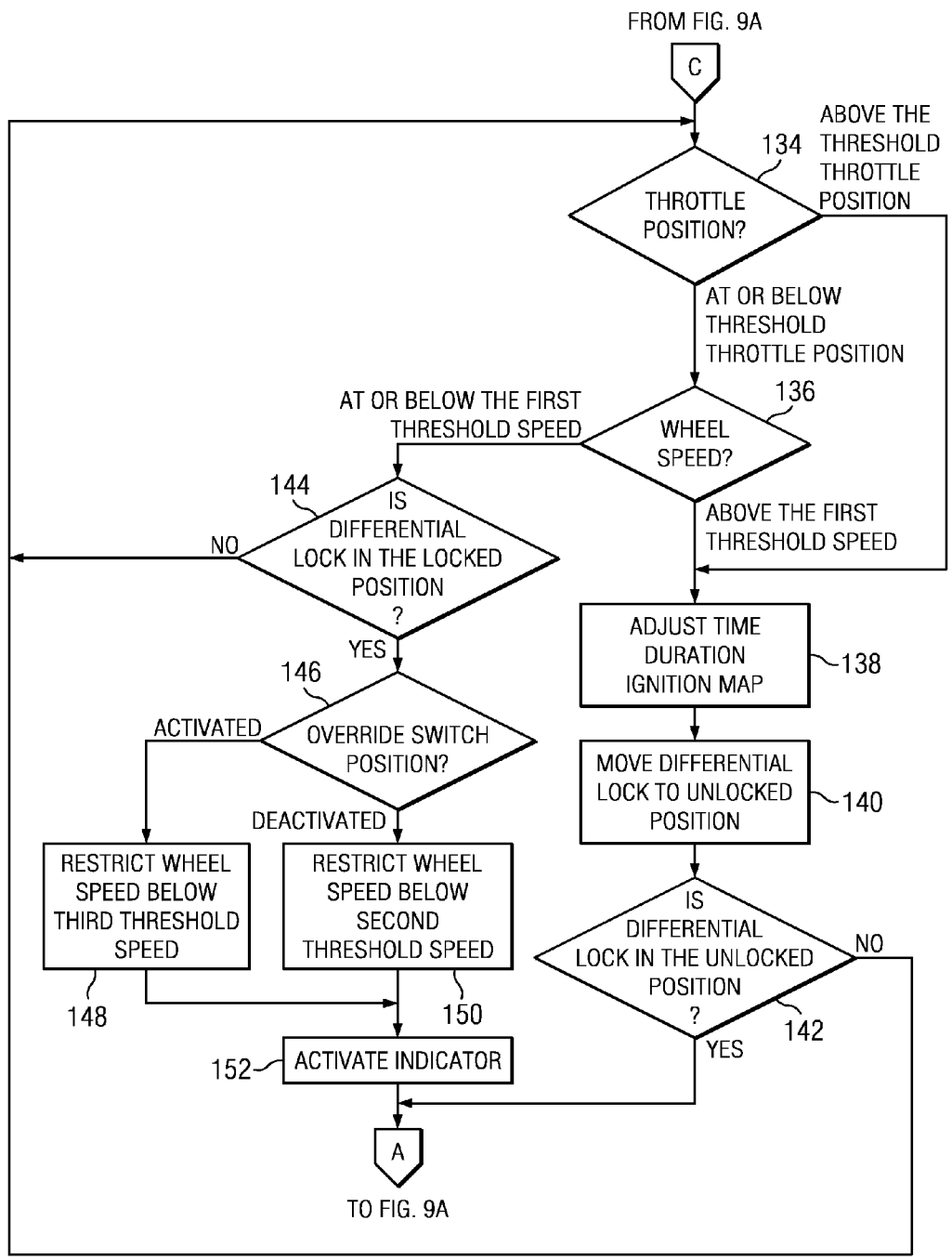
Figure 9C:
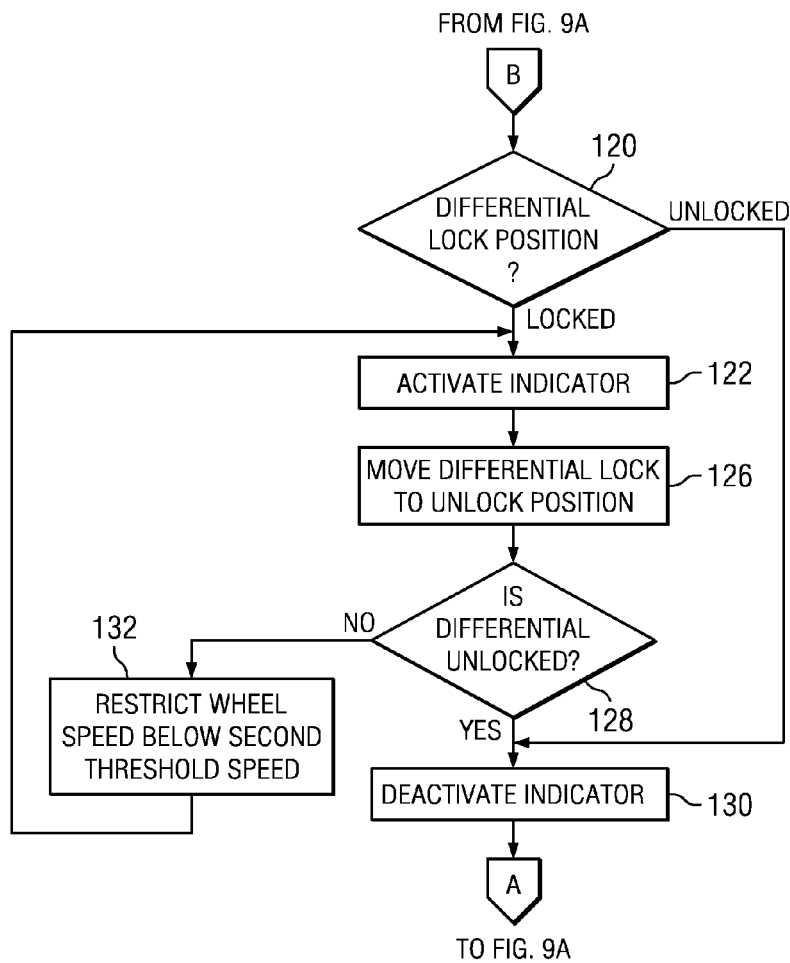

One embodiment of a control routine implemented by the differential lock controller 52 is generally illustrated in FIGS. 9A-9C. The differential lock controller 52 can monitor the selector switch to determine whether the selector switch is in the lock-initiate position or the unlock-initiate position (100). If the selector switch is in the lock-initiate position, the indicator 70 is flashed (101), and the state of the differential lock is determined (102). If the differential lock is in the locked position, the wheel speed is restricted (112) and the indicator 70 is activated (114). If the differential lock is in the unlocked position, the wheel speed is determined (104). If the wheel speed is above the first threshold, the differential lock is maintained in the unlocked position (116) and the indicator light 70 is flashed (118). If the wheel speed is at or below the first threshold speed, the transmission gear is determined (106). If the transmission 34 is in the second, third, fourth, fifth or overdrive driving gears, the differential lock is maintained in the unlocked position (116) and the indicator light 70 is flashed (118). If the transmission 34 is in the reverse gear, neutral gear, or first driving gear, the differential lock is moved to the locked position (108) and the differential lock controller 52 determines if the differential is fully locked (110). If the differential 18 is not fully locked (e.g., the differential lock is still moving from the unlock position to the lock position), the differential lock controller 52 initiates a lost motion differential protection scheme, as illustrated in FIG. 9C and discussed further below. However, if the differential is fully locked, then the position of the override switch 63 is determined (111). If the override switch 63 is in the OFF position, the wheel speed is restricted to the second threshold speed (112). If the override switch is in the ON position, the wheel speed is restricted to the third threshold speed (113). The indicator 70 is then activated (114) and the position of the selector switch is again determined (100).

If the selector switch is in the unlock-initiate position, the position of the differential lock is determined (120). If the differential lock is in the locked position, the indicator 70 is activated (122), the differential lock is moved to the unlocked position (126) and the differential lock controller 52 determines if the differential is fully unlocked (128). If the differential is not fully unlocked (e.g., the differential lock is still moving from the locked to the unlocked position), the differential lock controller 52 restricts the engine speed such that wheel speed stays below a second threshold speed (132) while continuing to activate indicator 70 and unlock the differential 18. However, if the differential 18 is fully unlocked, then the indicator 70 is deactivated (130), and the position of the selector switch is again determined (100).

As described above, if the differential lock is moving to the locked position (108) but is not yet in the locked position (110), the differential lock controller 52 initiates the lost motion differential protection scheme. As illustrated in FIG. 9C, the differential lock controller 52 initiates the lost motion differential protection scheme by determining the position of the throttle (134). If the throttle position is at or below a threshold throttle position then the wheel speed (136) is determined. If the throttle position is above the threshold throttle position or the wheel speed is above the first threshold speed, the ignition timing of the engine 41 is adjusted (e.g., retarded) by adjusting a time duration ignition map for the ignition system (138) to enable slowing of the vehicle 10. The differential lock is then moved to the unlocked position (140) until the differential lock is in the fully unlocked position (142) or the throttle position and the wheel speed are below the threshold throttle position and the first threshold wheel speed, respectively. If the throttle position and the wheel speed are below the threshold throttle position and the first threshold wheel speed, respectively, the position of the differential lock is determined (144). If the differential lock is not in the locked position, the differential lock controller 52 determines the throttle position (134) again. If the differential lock is the locked position, the position of the override switch 63 is determined (146). If the override switch is ON, the wheel speed is restricted to below the third threshold speed (148) and the indicator 70 is activated (146). If the override switch 63 is OFF, the wheel speed is restricted to the second threshold speed (144) and the indicator 70 is activated (146). Once the indicator 70 is activated (146), the position of the selector switch is again determined (100). It will be appreciated that a differential lock controller 52 can be configured to implement any of a variety of variations upon the control routine shown and described in connection with FIGS. 9A-9C.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   an engine;
   a pair of wheels;
   a speed sensor configured to detect a wheel speed of at least one of the pair of wheels;
   a differential coupled with the pair of wheels;
   a lock associated with the differential and movable between a locked position and an unlocked position;
   a transmission having an input and an output, the input being coupled with the engine, the output being coupled with the differential, and the transmission being configured to selectively and alternatively operate in a first gear and a second gear, wherein, when the transmission operates in the first gear, the input and the output are coupled together at a first gear ratio and, when the transmission operates in the second gear, the input and the output are coupled together at a second gear ratio;
   a selector switch movable between a lock-initiate position and an unlock-initiate position; and
   a differential lock controller coupled with the speed sensor, the lock, the transmission, and the selector switch, wherein, upon movement of the selector switch into the unlock-initiate position, the differential lock controller is configured to facilitate movement of the lock into the unlocked position and wherein, upon movement of the selector switch into the lock-initiate position, the differential lock controller is configured to:
      facilitate movement of the lock into the locked position when both the transmission operates in the first gear and the wheel speed is at or below a first threshold speed;
      inhibit movement of the lock when the wheel speed is above the first threshold speed; and
      inhibit movement of the lock when the transmission operates in the second gear.

2. The vehicle of claim 1 wherein the differential lock controller is further coupled with the engine and, when the lock is in the locked position, is configured to restrict the wheel speed to below a second threshold speed.

3. The vehicle of claim 1 further comprising a transmission switch associated with the transmission and movable between a first position and a second position, wherein movement of the transmission switch to the first position facilitates operation of the transmission in the first gear and movement of the transmission switch to the second position facilitates operation of the transmission in the second gear.

4. The vehicle of claim 3 wherein the first gear comprises one of a neutral gear, a reverse gear, and a first forward driving gear.

5. The vehicle of claim 4 wherein the second gear comprises one of a second forward driving gear, a third forward driving gear, a fourth forward driving gear, a fifth forward driving gear, and an overdrive forward driving gear.

6. The vehicle of claim 1 wherein the first gear ratio is greater than the second gear ratio.

7. The vehicle of claim 1 wherein the transmission comprises a continuously variable transmission, the first gear ratio comprises a first gear ratio range and the second gear ratio comprises a second gear ratio range.

8. The vehicle of claim 1 further comprising a lock indicator coupled with the differential lock controller and configured to indicate when the lock is in the locked position.

9. The vehicle of claim 8 wherein the lock indicator is further configured to indicate when the lock is inhibited from moving to the locked position when the selector switch is in the lock-initiate position.

10. The vehicle of claim 1 further comprising a lever, the selector switch being coupled with the lever and the lever being movable between a first position, a second position, and a third position wherein, when the lever is in the third position, the lever facilitates movement of the selector switch to the lock-initiate position.

11. The vehicle of claim 1 wherein the selector switch comprises a pushbutton.

12. The vehicle of claim 2 wherein the first threshold speed is about 6 M.P.H. and the second threshold speed is about 20 M.P.H.

13. A vehicle comprising:
an engine comprising a throttle;
a pair of wheels;
a speed sensor configured to detect a wheel speed of at least one of the pair of wheels;
a differential coupled with the pair of wheels;
a lock associated with the differential and movable between a locked position and an unlocked position;
a selector switch movable between a lock-initiate position and an unlock-initiate position;
a differential lock controller coupled with the speed sensor, the lock, and the selector switch, wherein, upon movement of the selector switch into the unlock-initiate position, the differential lock controller is configured to facilitate movement of the lock into the unlocked position and wherein, upon movement of the selector switch into the lock-initiate position, the differential lock controller is configured to:
inhibit movement of the lock when the wheel speed is above a first threshold speed;
facilitate returning of the lock to the unlocked position if a position of the throttle exceeds a threshold position during movement of the lock to the locked position; and
facilitate movement of the lock into the locked position when both the position of the throttle is below the threshold position and the wheel speed is at or below the first threshold speed.

14. The vehicle of claim 13 wherein the differential lock controller is further configured to facilitate adjustment of the timing of an ignition system when at least one of the following occurs with the differential lock between the locked position and the unlocked position:

the position of the throttle exceeds the threshold position; and
the wheel speed exceeds the first threshold speed.

15. The vehicle of claim 13 further comprising an override switch configured to allow an operator to select restriction of the wheel speed a second threshold speed and a third threshold speed when the differential is locked, wherein the second and third threshold speeds are different.

16. A vehicle comprising:
a wheel configured to rotate at a wheel speed;
a differential coupled with the wheel;
a lock associated with the differential and movable between a locked position and an unlocked position;
a differential lock controller associated with the lock, wherein during movement of the lock into one of the unlocked position and the locked position, the differential lock controller is configured to facilitate movement of the lock to the locked position and the unlocked position, respectively, in response to the wheel speed.

17. The vehicle of claim 16 wherein during movement of the lock into one of the unlocked position and the locked position, the differential lock controller is configured to facilitate movement of the lock to the locked position and the unlocked position, respectively, when the wheel speed exceeds a threshold speed.

18. The vehicle of claim 17 wherein the differential lock controller is further configured to inhibit movement of the lock when the wheel speed is above the threshold speed.

19. The vehicle of claim 16 further comprising an engine throttle, wherein during movement of the lock into one of the unlocked position and the locked position, the differential lock controller is configured to facilitate movement of the lock to the locked position and the unlocked position, respectively, when the engine throttle moves beyond a threshold position.

20. The vehicle of claim 16 further comprising a transmission, wherein during movement of the lock into one of the unlocked position and the locked position, the differential lock controller is configured to facilitate movement of the lock to the locked position and the unlocked position, respectively, if the transmission operates in a predetermined gear.

* * * * *